May 13, 1930.  C. M. REED  1,758,763
ANIMAL TRAP
Filed April 25, 1929    2 Sheets-Sheet 1
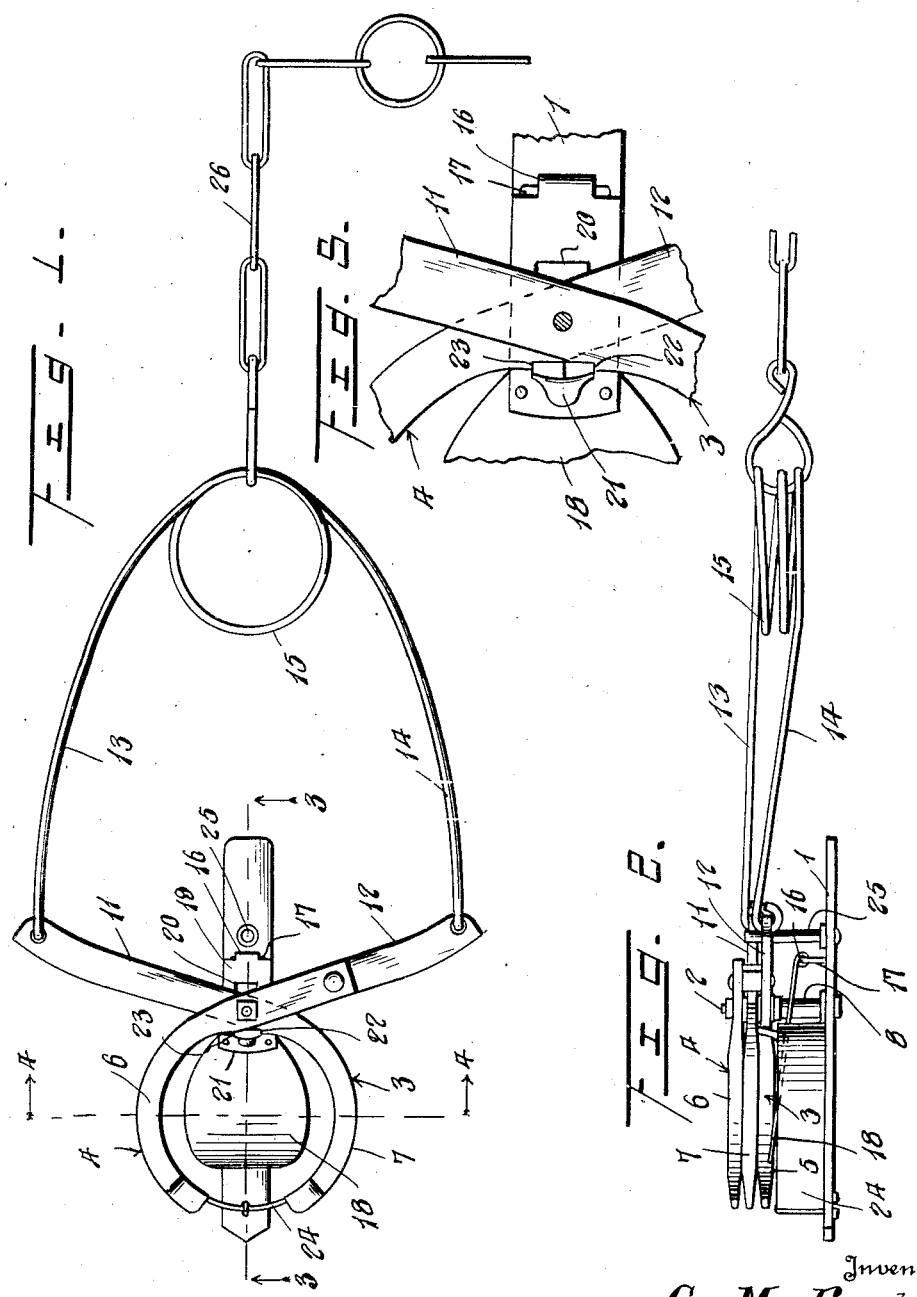
Inventor
C. M. Reed.

May 13, 1930.  C. M. REED  1,758,763
ANIMAL TRAP
Filed April 25, 1929   2 Sheets-Sheet 2
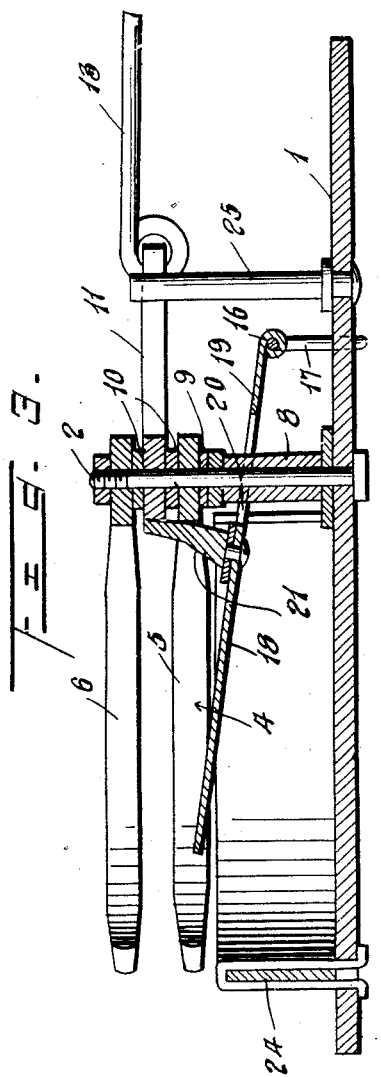
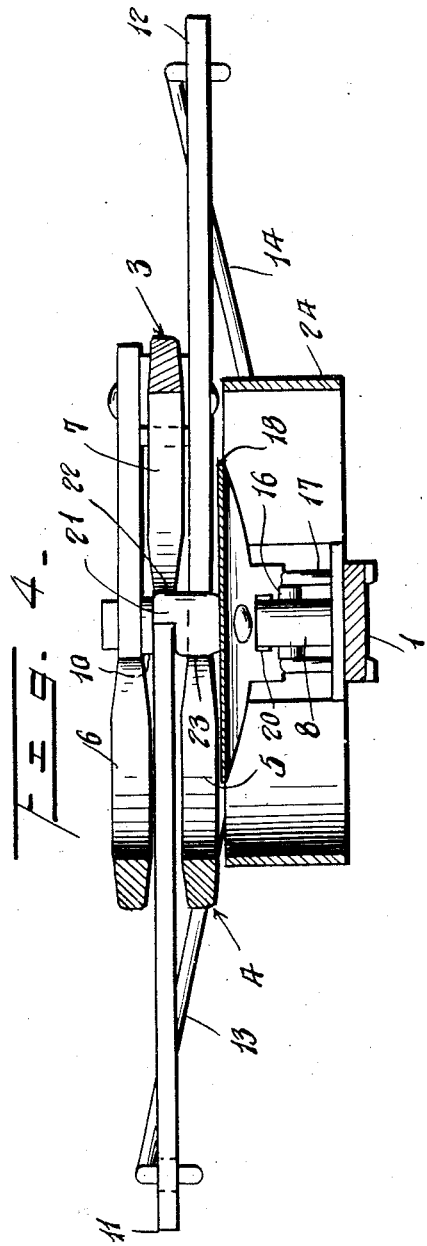
Inventor
C. M. Reed Patented May 13, 1930

1,758,763

UNITED STATES PATENT OFFICE

CHARLES M. REED, OF KABLETOWN, WEST VIRGINIA

ANIMAL TRAP

Application filed April 25, 1929. Serial No. 358,071.

The invention relates to traps for catching and holding fur-bearing animals and has for its object the provision of a trap that will dispense with the cruelty of the steel trap of well known construction and that will at the same time securely hold the animal entrapped, the holding means dispensing with the torture inflicted by the commonly used steel trap.

A further object of the invention is the provision of a trap that will engage the leg of the animal considerably above the foot and securely hold it without torture and thereby obviate the danger of the animal releasing itself from the trap by gnawing the entrapped leg, as is frequently done where an animal is trapped by a steel trap.

A further object of the invention is the provision of a trap that because of its humane operation will not in anywise endanger spoiling the fur of the animal entrapped.

The invention will be described in detail hereinafter and will be found illustrated in the accompanying drawings in which Figure 1 is a top plan view of the improved trap showing it in set position, Figure 2 is a side view in elevation of the trap as disclosed in Figure 1, Figure 3 is a longitudinal sectional view on a plane indicated by the line 3—3 of Figure 1, Figure 4 is a transverse sectional view on the plane indicated by the line 4—4 of Figure 1, and Figure 5 is a fragmental detail of the jaws and trigger in set position.

In the drawings similar reference characters are used to designate corresponding parts throughout the several views.

The base 1 of the trap has a pin 2 secured thereto on which are pivoted the two jaw members 3 and 4, the paw 4 comprising spaced fingers 5 and 6 while jaw 3 has a single finger 7 that operates between the fingers 5 and 6, said fingers being curved toward one another. The jaw members 3 and 4 are spaced above the base 1 by means of a spacing sleeve 8 and bearing washers 9, and the fingers 5 and 6 are spaced from the finger 7 by spacing washers 10 mounted on the pin 2. The rearwardly extended arms 11 and 12 of the respective jaw members 3 and 4 are engaged by the arms 13 and 14, respectively, forming the ends of a contractile coil spring 15.

Pivoted as shown at 16 to an inverted U-shaped member 17 is a trigger plate 18, the extension 19 thereof that is pivoted as shown at 16 being slotted as shown at 20 to receive the pin 2 and spacing sleeve 8. Secured to the trigger plate 18 is an upright lug or projection 21 that is adapted to engage in notches 22 and 23 in the jaw members 3 and 4, respectively, when the trap is set to hold said jaws in open position, it being understood that when the trigger plate 18 is depressed by the foot of an animal the lug 21 will be withdrawn from engagement in the notches 22 and 23 and the jaws 3 and 4 will thereby be released to the action of the spring 15 and the fingers, 5, 6, and 7 will be closed on the leg of the animal to hold it entrapped.

Surrounding the plate 18 and secured to the base 1 is a circular frame 24 that serves to prevent trash from getting under the plate 18 and preventing its operation and also prevents the animal from getting to his foot to gnaw it off to enable him to release himself from the trap, and secured to the base 1 is a pin 25 that will limit the swinging of the jaws when in trapped position to prevent the possibility of the animal so positioning the trap that he could use the circular frame 24 for leverage to release his foot and leg.

26 indicates a chain that is secured to the spring 15 at one end and adapted to be secured to a stake or other fixed member, it being clear that when the animal is once trapped and his leg engaged by the jaws of the trap his struggle to release himself by pulling will operate to cause the jaws of the trap to more securely clamp the leg by the scissorslike movement of the jaws against the chain.

What is claimed is:—

1. An animal trap, comprising a base, a pin supported by said base, jaws pivotally mounted on said pin, said jaws including fingers curved toward one another and adapted to engage an animal's leg, said jaws having arms extending in opposite directions from said pin, a contractile spring connecting the free ends of said arms, and means to hold the jaws in set position and operable by an animal to release the jaws to the action of the spring.

2. An animal trap, comprising a base, a pin supported by said base, jaws pivotally mounted on said pin, said jaws including fingers curved towards one another and adapted to engage an animal's leg, said jaws having arms extending in opposite directions from said pin, a contractile spring connecting the free ends of said arms, said jaws having notches therein, a trip pan pivotally mounted on the base, and a lug on said pan and engageable in said notches to hold the jaws in set position.

3. An animal trap, comprising a base, a pin supported on said base, jaws pivotally mounted on the pin, said jaws including fingers curved towards one another and adapted to engage an animal's leg, said jaws having arms extending in opposite directions from said pin, a contractile spring connecting the free ends of said arms, means to hold the jaws in set position and operable by an animal to release the jaws to the action of said spring, a circular frame secured to the base and enclosing said means, and a stop carried by the base and engageable with the jaws to limit their movement in sprung positions and prevent the engaged part of the animal moving out of said circular frame.

In testimony whereof I affix my signature.

CHARLES M. REED.